Oct. 11, 1960
P. I. ZANDBERG ET AL
2,955,831
BUR CHUCK
Filed Jan. 27, 1959
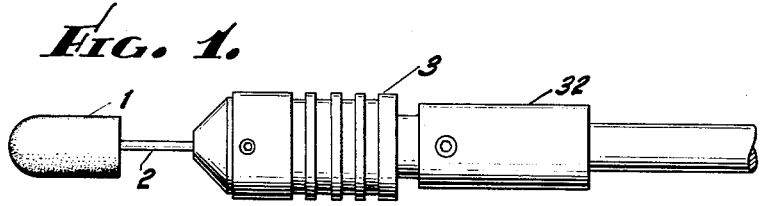
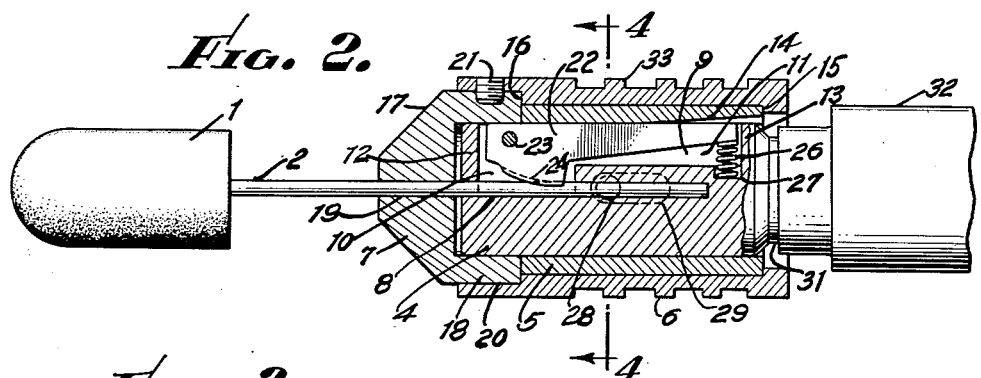
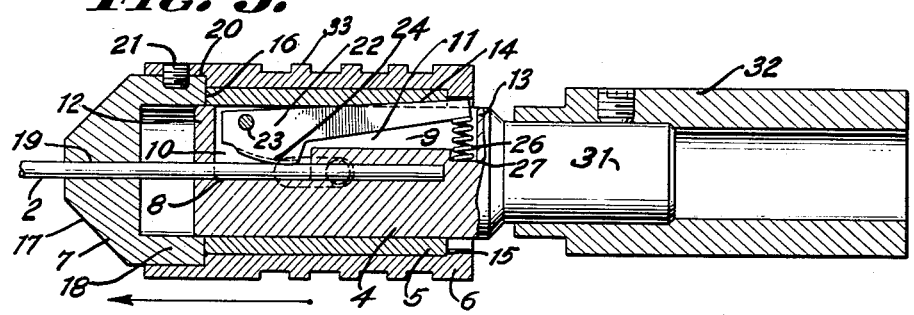
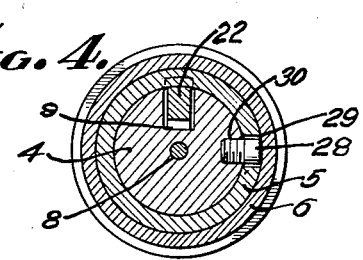
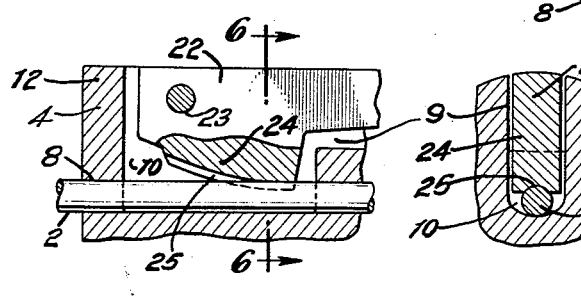
INVENTORS,
PAUL I. ZANDBERG,
MILTON L. LAPPIN;
By Calvin Brown,
ATTORNEY.

United States Patent Office 2,955,831
Patented Oct. 11, 1960

2,955,831

BUR CHUCK

Paul I. Zandberg, 744 N. Martel Ave., Los Angeles, Calif., and Milton L. Lappin, 2362 Westwood Blvd., West Los Angeles, Calif.

Filed Jan. 27, 1959, Ser. No. 789,413

1 Claim. (Cl. 279—78)

The present invention relates to improvements in bur chucks and contemplates a device for use in the dental field.

The device has for an object, a chuck which permits the stem or stock of the sanding or cutting bur to be positively gripped by the chuck in such a manner that the bur will not turn except when the chuck is driven by some device such as a motor.

A further object is the provision of a bur type chuck so constructed and arranged as to allow for easy replacement of parts and which is easily disassembled.

The invention has for further objects, a device which is simple of construction, inexpensive in cost to manufacture and generally superior to chucks now known to the inventors.

In the drawing:

Figure 1 is fragmentary side elevation of the bur chuck of the invention shown carrying a sanding or cutting bur;

Figure 2 is an enlarged view partially in section and partially in fragment showing the internal construction of the chuck, the chuck and the stock being shown in locked position;

Figure 3 is a view similar to that of Figure 2, the stock being in released position;

Figure 4 is a sectional view on the line 4—4 of Figure 2;

Figure 5 is an enlarged fragmentary partially sectional detail of locking means for the chuck for gripping the bur stock, and Figure 6 is a fragmentary sectional view on the line 6—6 of Figure 5.

Referring now to the drawing, we have shown at 1, a sanding or cutting bur mounted on the usual stem or stock 2. The stem or stock is elongated and of small diameter. The chuck for the said stem or stock 2 is designated as an entirety by 3 and includes a cylindrical mandrel 4 enclosed within a tubular type sleeve 5 surrounded by a spindle 6. Secured to the spindle 6 at one end thereof is a hood 7. As shown in the figures, the mandrel 4 is provided with an axial bore 8 for receiving the stem or stock 2 and the said mandrel is provided with an elongated groove 9 of varying depth. Referring to Figure 2, a forward portion 10 of said groove 9 extends to the axis of the mandrel. (See Figure 6.) The remaining portion 11 of said groove 9 has reduced depth. The groove 9 is confined at one end by a front wall 12 and by a rear wall 13.

The sleeve 5 which surrounds the mandrel 4, is internally formed with a tapered, reduced wall thickness at 14. The sleeve otherwise is of uniform thickness. The spindle which surrounds the sleeve has an internal annular shoulder at 15 which engages an end of the sleeve while the opposite end of the sleeve is adapted to be in close proximity to and to bear lightly against the end wall 16 of the hood 7. The hood 7 has a tapered nose 17 which merges with an annular side wall 18, the internal diameter of the annular side wall being sufficient to accommodate an end portion of the mandrel 4, the hood is centrally bored at 19 so as to allow passage of the stock or stem 2 through the hood and into the bore 8 of the mandrel. As shown, the spindle 6 has an enlarged diameter portion 20 which accommodates the annular wall 18 of the hood and the said spindle and hood are secured together in any appropriate manner such as by a set screw 21.

The mandrel groove 9 is adapted to confine a finger holder 22. This finger holder extends substantially the length of the groove 9 and is pinned at 23 for movement. The finger holder has an enlarged head portion 24 of varying radius relative to the pin 23 as a center to provide a cam 24 having a grooved edge 25 for engagement with the stem or stock 2. The end of the finger holder remote from the pin 23 is constantly urged to revolve counterclockwise by small spring 26 confined in part within recess 27 of the mandrel.

As shown in Figure 4 the mandrel 4 and sleeve 5 are secured against relative rotation by means of a set screw 28 passed through an elongated slot 29 in the sleeve and engaging the threads in a threaded bore 30 of the mandrel. The elongated slot permits the mandrel to be axially moved relative to the sleeve.

As shown in Figure 3 the mandrel 4 has a reduced diameter end extension 31 to which is secured a connector or fitting 32 and which fitting in turn receives the end of a shaft of some form for rotating the bur 1.

The operation, uses and advantages of the device just described are as follows:

It will be observed that the spindle 6 is provided upon its periphery with spaced apart annular shoulders 33 which furnish a convenient hand or finger grip for holding the tool as an entirety. Furthermore when gripping the spindle it is evident that the mandrel 4 as well as the sleeve 5 may rotate within the spindle and the hood 7. If we assume that the parts are in the position shown in Figure 3, the stock 2 may be inserted through the bore 19 of the hood into the bore 8 of the mandrel and in this position the spring 26 urges the finger holder to revolve counterclockwise so that the cam 24 is out of engagement with the stock or stem 2. In this position the top edge of the finger holder engages the inclined surface 14 of the sleeve which of course permits rotation of the finger holder to the position shown in Figure 3, attention being called to the fact that the top edge of the finger holder is straight. In the position shown in Figure 3, the hood has moved forwardly of the wall end 12 of the mandrel so that there is a space therebetween. When it is desired to lock the stock or stem 2 within the bore of the mandrel, the spindle with its hood is moved to the right of the showing of Figure 3 or to the position of Figure 2 whereupon the straight upper edge of the finger holder engages the uniform thickness portion of the sleeve and rotates the finger holder clockwise to compress spring 26 and force the cam 24 into tight engagement with the stem or stock 2. When the cam is engaging the stem or stock 2 it is impossible to release the stock by pulling outwardly thereon and the stock or stem 2 may be released while the motor is in operation and driving the mandrel by the operator moving the spindle to the left of the showing of Figure 3 which will immediately release the cam of the finger holder from stem or stock engagement.

The device is quite simple of structure, and may be readily disassembled by removing set screws 21 and 28.

We claim:

A bur chuck for securing the cylindrical stock of a sanding or cutting bur including: a cylindrical mandrel formed with a longitudinally extended slot and with an axial bore communicating with said slot, a finger holder formed with a head having a grooved cam edge portion, means pivoting the finger holder within the longitudinal slot whereby the head may be moved within the axial bore and outwardly thereof, means normally moving the finger holder to position the grooved cam edge of the head outwardly of the axial bore in the mandrel, a tubular sleeve in part surrounding the mandrel and secured thereto for relative axial and joint rotary movement, said tubular sleeve in one position engaging the finger holder to maintain the grooved cam edge portion of the head within the axial bore of the mandrel for pressure engagement with the cylindrical stock of the cutting bur, movement of said tubular sleeve in an opposite direction releasing the finger holder for pivotal movement to space the grooved cam edge of the head outwardly of said axial bore, and a non-driven tubular spindle surrounding the sleeve for moving the sleeve axially of the mandrel.

References Cited in the file of this patent

UNITED STATES PATENTS

| | | |
|---|---|---|
| 283,745 | Bartlett | Aug. 28, 1883 |
| 810,230 | Swan | Jan. 16, 1906 |
| 2,279,310 | Grey | Apr. 14, 1942 |